(12) United States Patent
Kwak et al.

(10) Patent No.: US 10,952,201 B2
(45) Date of Patent: Mar. 16, 2021

(54) METHOD FOR TRANSMITTING AND RECEIVING DOWNLINK CONTROL INFORMATION IN WIRELESS COMMUNICATION SYSTEM AND DEVICE FOR SAME

(71) Applicant: LG ELECTRONICS INC., Seoul (KR)

(72) Inventors: Kyuhwan Kwak, Seoul (KR); Daesung Hwang, Seoul (KR); Hyunho Lee, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/477,865

(22) PCT Filed: Jan. 5, 2018

(86) PCT No.: PCT/KR2018/000280
§ 371 (c)(1),
(2) Date: Jul. 12, 2019

(87) PCT Pub. No.: WO2018/131842
PCT Pub. Date: Jul. 19, 2018

(65) Prior Publication Data
US 2020/0229153 A1 Jul. 16, 2020

Related U.S. Application Data

(60) Provisional application No. 62/445,723, filed on Jan. 12, 2017.

(51) Int. Cl.
*H04W 72/04* (2009.01)

(52) U.S. Cl.
CPC ................ *H04W 72/042* (2013.01)

(58) Field of Classification Search
CPC .................................................. H04W 72/042
(Continued)

(56) References Cited

U.S. PATENT DOCUMENTS

2011/0269492 A1 11/2011 Wang
2013/0163551 A1 6/2013 He et al.

FOREIGN PATENT DOCUMENTS

WO 2016064048 4/2016

OTHER PUBLICATIONS

PCT International Application No. PCT/KR2018/000280, International Search Report dated Apr. 20, 2018, 12 pages.
(Continued)

*Primary Examiner* — Angel T Brockman
(74) *Attorney, Agent, or Firm* — Lee Hong Degerman Kang Waimey

(57) ABSTRACT

Disclosed are a method for transmitting and receiving downlink control information (DCI) in a wireless communication system and a device for same. Particularly, in a method for receiving downlink control information by a terminal in a wireless communication system, the method can comprise the steps of: receiving first DCI from a base station via a first downlink control channel on the basis of a first transmission time interval (TTI); and receiving second DCI from the base station by means of control channel information via a second downlink control channel on the basis of a second TTI, wherein the first DCI comprises the control channel information indicating one or more merge levels relating to the reception of the second DCI among a plurality of predetermined merge levels.

13 Claims, 11 Drawing Sheets

(58) Field of Classification Search
USPC .......................................................... 370/329
See application file for complete search history.

(56) References Cited

OTHER PUBLICATIONS

CMCC, "Discussion on DCI contents for NR PDCCH", 3GPP TSG RAN WG1 Meeting #87, R1-1612190, Nov. 2016, 5 pages.
Samsung, "sDCI for sTTI operation", 3GPP TSG RAN WG1 Meeting #87, R1-1612406, Nov. 2016, 6 pages.
European Patent Office Application Serial No. 18739191.7, Search Report dated Jul. 24, 2020, 7 pages.
Huawei, HiSilicon, "sPDCCH design for short TTI", R1-164059, 3GPP TSG RAN WG1 Meeting #85, May 2016, 6 pages.
Huawei, HiSilicon, "DCI design for short TTI", R1-164060, 3GPP TSG RAN WG1 Meeting #85, May 2016, 15 pages.

METHOD FOR TRANSMITTING AND RECEIVING DOWNLINK CONTROL INFORMATION IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2018/000280, filed on Jan. 5, 2018, which claims the benefit of U.S. Provisional Application No. 62/445,723, filed on Jan. 12, 2017, the contents of which are all hereby incorporated by reference herein in its entirety.

TECHNICAL FIELD

The present invention relates to a wireless communication system, and more particularly to a method for transmitting and receiving downlink control information and a device supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

The present specification proposes a method for transmitting and receiving downlink control information (DCI) in a wireless communication system.

Specifically, the present specification proposes a method for transmitting and receiving DCI in 2-step in a wireless communication system supporting a short transmission time interval (TTI).

In this regard, the present specification proposes a method for transmitting configuration information related to DCI (i.e., second DCI) transmitted in a second step through DCI (i.e., first DCI) transmitted in a first step.

Technical problems to be solved by the present invention are not limited by the technical problems mentioned above, and other technical problems which are not mentioned above can be clearly understood from the following description by those skilled in the art to which the present invention pertains.

Technical Solution

In a method for receiving, by a user equipment, downlink control information (DCI) in a wireless communication system according to embodiments of the present invention, the method comprises receiving, from a base station, first DCI via a first downlink control channel based on a first transmission time interval (TTI), wherein the first DCI includes control channel information representing at least one aggregation level related to a reception of second DCI among a plurality of predetermined aggregation levels, and receiving, from the base station, the second DCI via a second downlink control channel based on a second TTI using the control channel information.

In the method according to embodiments of the present invention, the control channel information may indicate a maximum aggregation level of the at least one aggregation level.

In the method according to embodiments of the present invention, the plurality of predetermined aggregation levels may be configured as one or more aggregation level groups, and the control channel information may indicate a specific aggregation level group of the one or more aggregation level groups.

The method according to embodiments of the present invention may further comprise receiving, from the base station, aggregation level configuration information representing the one or more aggregation level groups via higher layer signaling.

In the method according to embodiments of the present invention, the control channel information may indicate a specific aggregation level of the plurality of predetermined aggregation levels, and the at least one aggregation level may be configured to an aggregation level corresponding to a predetermined offset range around the specific aggregation level.

In the method according to embodiments of the present invention, the predetermined offset range may be configured to be movable within the plurality of predetermined aggregation levels according to a sliding indicator.

In the method according to embodiments of the present invention, the control channel information may further include window information representing the predetermined offset range and the sliding indicator.

The method according to embodiments of the present invention may further comprise receiving, from the base station, window information representing the predetermined offset range via higher layer signaling, and the sliding indicator may be included in the control channel information.

In the method according to embodiments of the present invention, the first DCI may further include information representing a valid time interval of the control channel information, and the valid time interval may be configured in units of subframe.

In the method according to embodiments of the present invention, the control channel information may be differently configured depending on whether the second DCI is DCI for uplink or DCI for downlink.

In the method according to embodiments of the present invention, the first TTI may correspond to a time for transmitting one subframe, and the second TTI may be configured to be shorter than the first TTI.

In the method according to embodiments of the present invention, the second TTI may be configured to be shorter than the first TTI, the first downlink control channel may be a physical downlink control channel (PDCCH), and the second downlink control channel may be a short PDCCH (sPDCCH).

In a user equipment receiving downlink control information (DCI) in a wireless communication system according to embodiments of the present invention, the user equipment comprises a radio frequency (RF) unit configured to transmit and receive a radio signal, and a processor functionally connected to the RF unit, wherein the processor controls to receive, from a base station, first DCI via a first downlink control channel based on a first transmission time interval (TTI), wherein the first DCI includes control channel information representing at least one aggregation level related to a reception of second DCI among a plurality of predetermined aggregation levels, and receive, from the base station, the second DCI via a second downlink control channel based on a second TTI using the control channel information.

Advantageous Effects

Embodiments of the present invention can reduce a time for receiving (i.e., decoding) second DCI and/or an overhead (e.g., decoding overhead) when a UE receives downlink control information (DCI) through 2-step.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the present invention and constitute a part of the detailed description, illustrate embodiments of the present invention and together with the description serve to explain the principle of the present invention.

MODE FOR INVENTION

Figure 1:
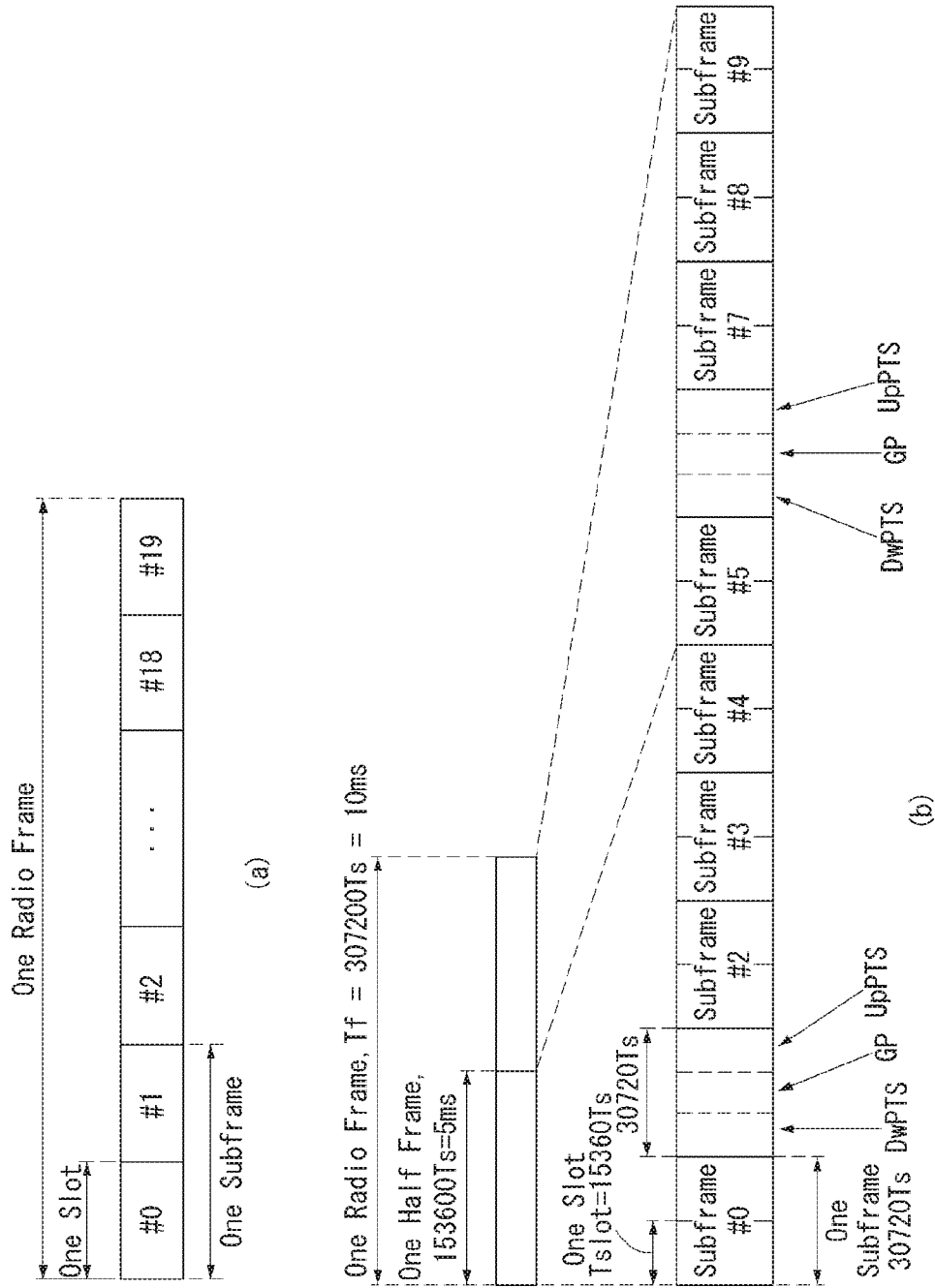
FIG. 1 is a view illustrating a structure of a radio frame in a wireless communication system to which the present invention is applicable.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an dvanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

Overview of System

FIG. 1 illustrates a structure of a radio frame in a wireless communication system to which the present invention can be applied.

A 3GPP LTE/LTE-A supports radio frame structure type 1 applicable to frequency division duplex (FDD) and radio frame structure type 2 applicable to time division duplex (TDD).

In FIG. 1, the size of the radio frame in the time domain is represented by a multiple of a time unit of $T\_s=1/(15000*2048)$. The downlink and uplink transmissions are configured by a radio frame having an interval of $T\_f=307200*T\_s=10$ ms.

FIG. 1(a) above illustrates the structure of radio frame type 1. Radio frame type 1 may be applied to both full duplex and half duplex FDDs.

The radio frame is constituted by 10 subframes. One radio frame is constituted by 20 slots having a length of $T\_slot=15360*T\_s=0.5$ ms and indexes of 0 to 19 are granted to each slot. One subframe is constituted by two consecutive slots in the time domain and subframe i is constituted by slot 2i and slot 2i+1. A time required for transmitting one subframe is referred to as a transmission time interval (TM). For example, a length of one subframe may be 1 ms and the length of one slot may be 0.5 ms.

In the FDD, the uplink transmission and the downlink transmission are classified in the frequency domain. There is no limit in the full duplex FDD, while in a half duplex FDD operation, the UE may not perform transmission and reception simultaneously.

One slot includes a plurality of orthogonal frequency division multiplexing (OFDM) symbols in the time domain and includes multiple resource blocks (RBs) in the frequency domain. Since the 3GPP LTE uses OFDMA in the downlink, the OFDM symbol is intended to represent one symbol period. The OFDM symbol may be referred to as one SC-FDMA symbol or symbol period. A resource block as a resource allocation unit includes a plurality of consecutive subcarriers in one slot.

FIG. 1(b) illustrates frame structure type 2. Radio frame type 2 is constituted by two half frames each having a length of $153600*T\_s=5$ ms. Each half frame is constituted by 5 subframes having a length of $30720*T\_s=1$ ms.

In frame structure type 2 of the TDD system, an uplink-downlink configuration is a rule indicating whether the uplink and the downlink are assigned (or reserved) for all subframes. Table 1 shows an uplink-downlink configuration.

TABLE 1

| Uplink-Downlink configuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of the radio frame, 'D' denotes a subframe for the downlink transmission, 'U' denotes a subframe for the uplink transmission, 'S' denotes a special subframe constituted by three fields, i.e., a downlink pilot time slot (DwPTS), a guard period (GP), and an uplink pilot time slot (UpPTS).

The DwPTS is used for initial cell search, synchronization, or channel estimation in the UE. The UpPTS is used to match the channel estimation at the base station and uplink transmission synchronization of the UE. The GP is a period for eliminating interference caused in the uplink due to a multi-path delay of a downlink signal between the uplink and the downlink.

Each subframe i is constituted by slot 2i and slot 2i+1 each having a length of $T\_slot=15360*T\_s=0.5$ ms.

The uplink-downlink configuration may be divided into 7 types and locations and/or the numbers of downlink subframes, special subframes, and uplink subframes vary for each configuration.

A point when the downlink is changed to the uplink or a point when the uplink is switched to the downlink is referred to as a switching point. Switch-point periodicity of the switching point means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and a subframe immediately following the subframe are always periods for the uplink transmission.

The uplink-downlink configuration as system information may be known by both the base station and the UE. The eNB transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and the configuration information as broadcast information may be commonly transmitted to all UEs in a cell through a broadcast channel.

Table 2 shows a configuration (the length of DwPTS/GP/UpPTS) of the special subframe.

TABLE 2

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·Ts |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | | |
| 5 | 6592·$T_s$ | | | 20480·$T_s$ | 4384·$T_s$ | 5120·$T_s$ |
| 6 | 19760·$T_s$ | 4384·$T_s$ | 5120·$T_s$ | 23040·$T_s$ | | |
| 7 | 21952·$T_s$ | | | — | — | — |
| 8 | 24144·$T_s$ | | | — | — | — |

The structure of the radio frame according to the example of FIG. 1 is merely an example and the number of subcarriers included in the radio frame or the number of slots included in the subframe, and the number of OFDM symbols included in the slot may be variously changed.

Figure 2:
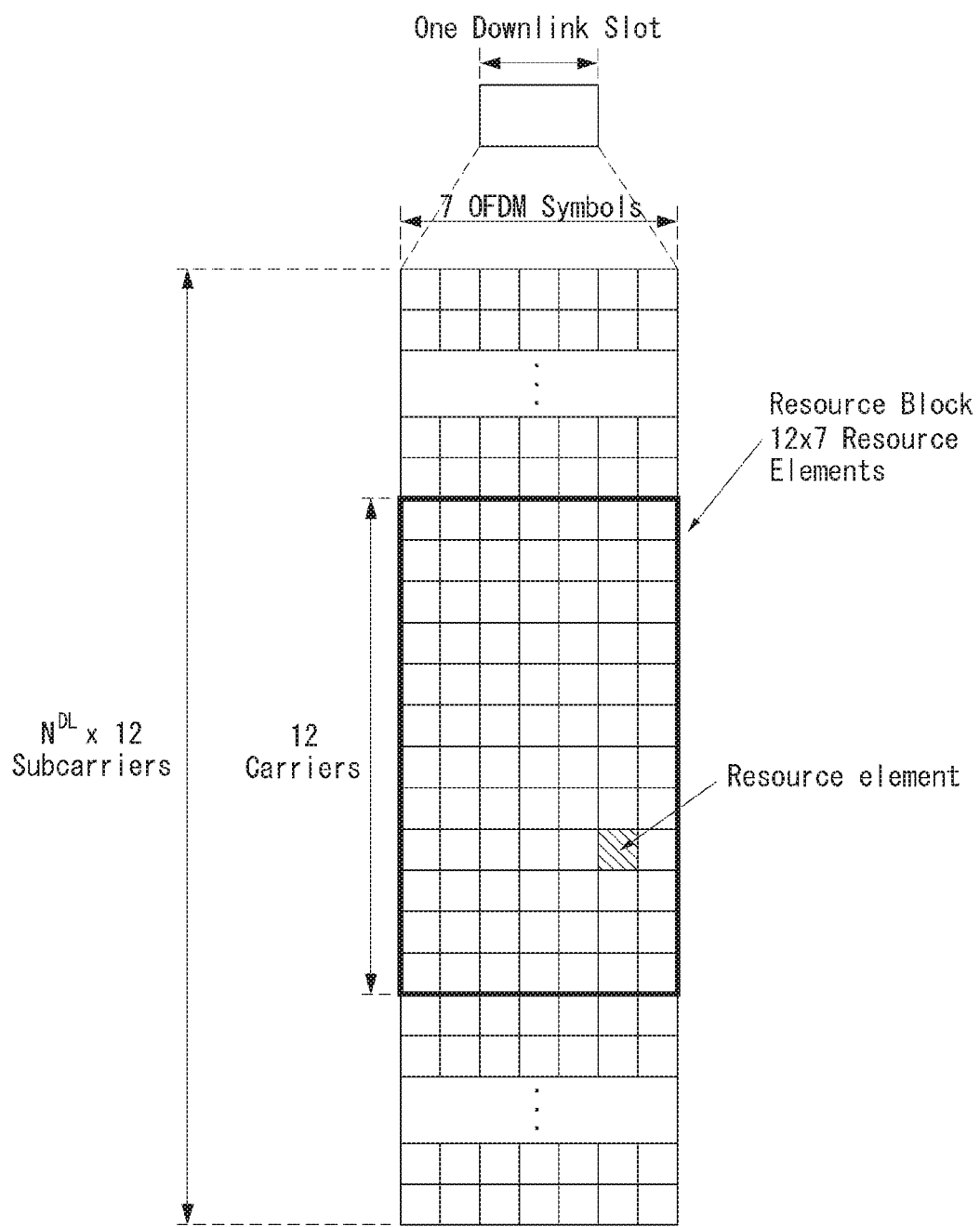
FIG. 2 is a view illustrating a resource grid for one downlink slot in a wireless communication system to which the present invention is applicable.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element, and one resource block includes 12×7 resource elements. The number of resource blocks included in the downlink slot, N^DL is subordinated to a downlink transmission bandwidth.

A structure of the uplink slot may be the same as that of the downlink slot.

Figure 3:
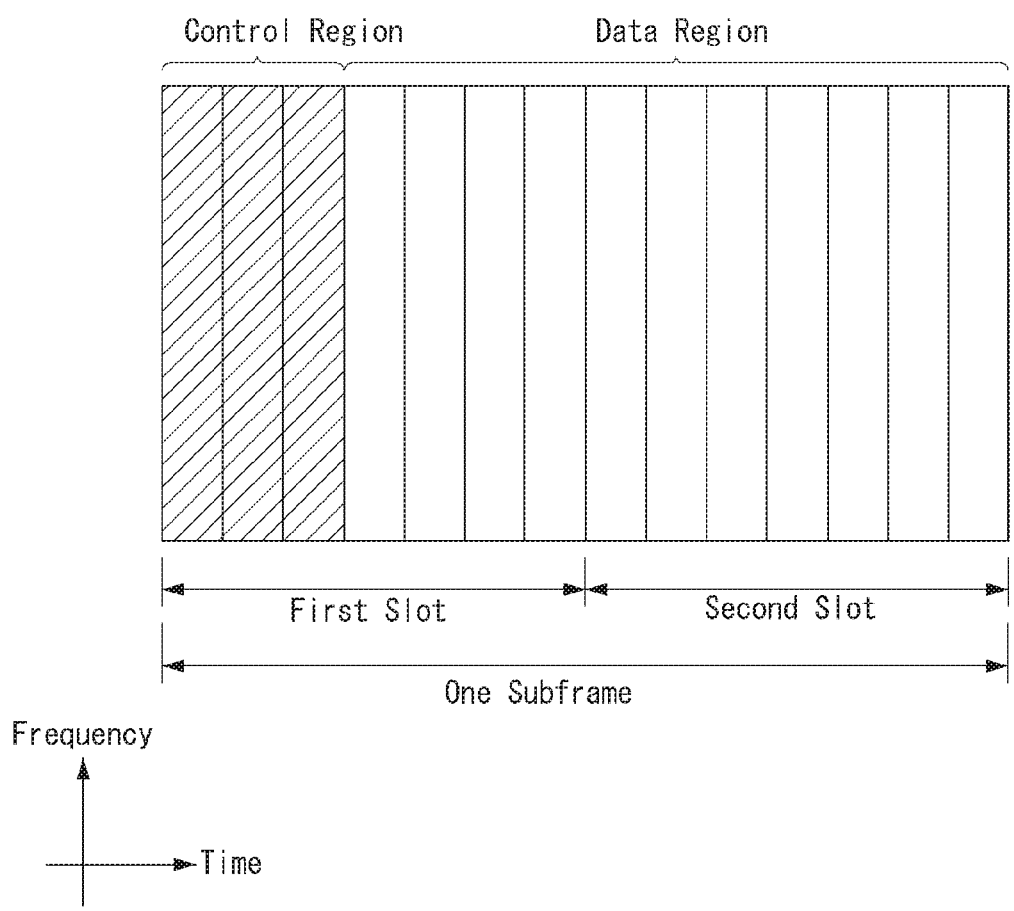
FIG. 3 is a view illustrating a structure of a downlink subframe in a wireless communication system to which the present invention is applicable.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked to the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

The enhanced PDCCH (EPDCCH) carries UE-specific signaling. The EPDCCH is located in a physical resource block (PRB) that is configured to be UE specific. In other words, as described above, the PDCCH may be transmitted in up to three OFDM symbols in the first slot in the subframe, but the EPDCCH can be transmitted in a resource region other than the PDCCH. The time (i.e., symbol) at which the EPDCCH starts in the subframe may be configured in the UE via higher layer signaling (e.g., RRC signaling, etc.).

The EPDCCH may carry a transport format, resource allocation, and HARQ information associated with DL-SCH, a transport format, resource allocation, and HARQ information associated with UL-SCH, resource allocation information associated with Sidelink Shared Channel (SL-SCH) and Physical Sidelink Control Channel (PSCCH), etc. Multiple EPDCCHs may be supported and the UE may monitor the set of EPCCHs.

The EPDCCH may be transmitted using one or more successive enhanced CCEs (ECCEs) and the number of ECCEs per EPDCCH may be determined for each EPDCCH format.

Each ECCE may be constituted by a plurality of enhanced resource element groups (EREGs). The EREG is used for defining mapping of the ECCE to the RE. There are 16 EREGs per PRB pair. All REs are numbered from 0 to 15 in the order in which the next time increases in the order in which the frequency increases, except for the RE carrying the DMRS in each PRB pair.

The UE may monitor a plurality of EPDCCHs. For example, one or two EPDCCH sets may be configured in one PRB pair in which the UE monitors EPDCCH transmission.

Different coding rates may be implemented for the EPCCH by merging different numbers of ECCEs. The EPCCH may use localized transmission or distributed transmission, and as a result, the mapping of the ECCE to the RE in the PRB may vary.

Figure 4:
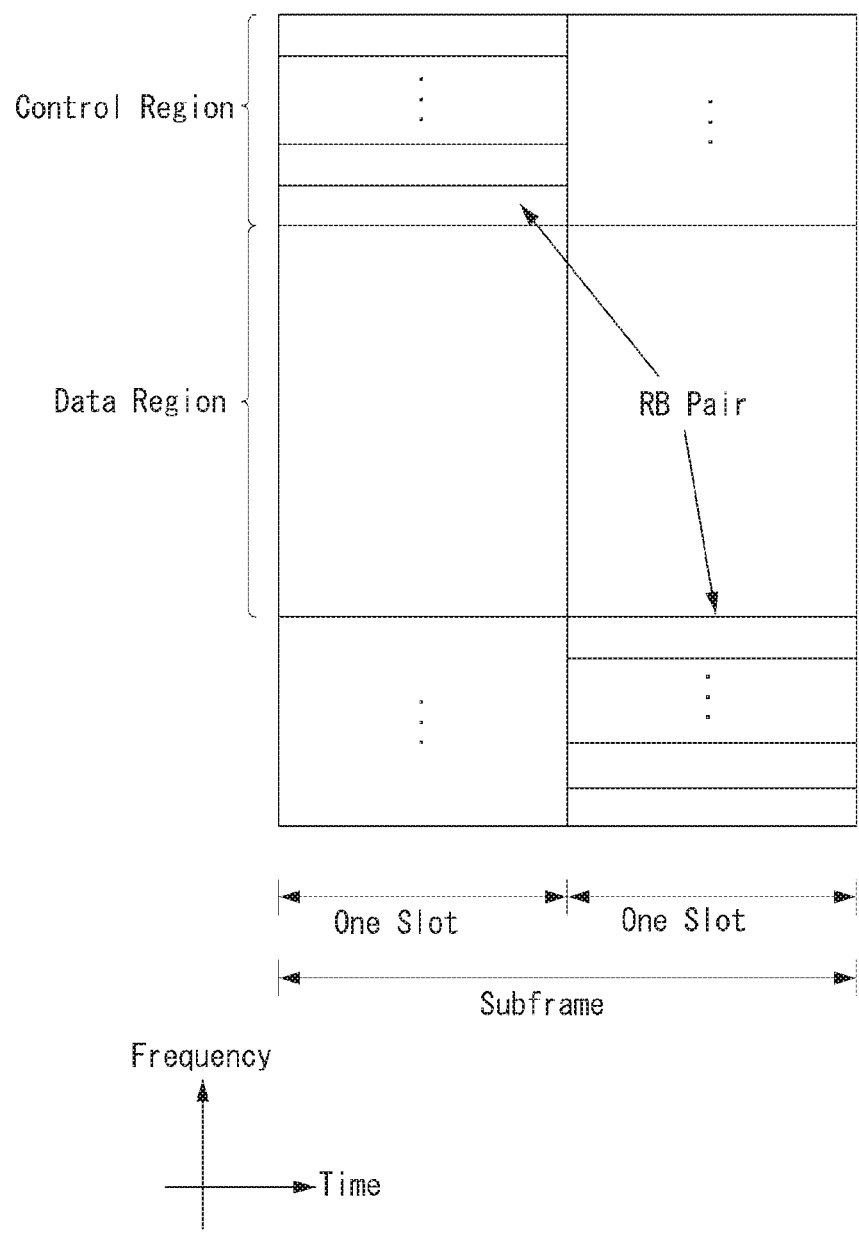
FIG. 4 is a view illustrating a structure of an uplink subframe in a wireless communication system to which the present invention is applicable.

FIG. 4 illustrates a structure of an uplink subframe in a wireless communication system to which the present invention can be applied.

Referring to FIG. 4, the uplink subframe may be divided into the control region and the data region in the frequency domain. A physical uplink control channel (PUCCH) carrying the uplink control information is allocated to the control region. A physical uplink shared channel (PUSCH) carrying the user data is allocated to the data region. In order to maintain a single carrier characteristic, one UE does not transmit the PUCCH and the PUSCH at the same time.

A resource block pair within the subframe is allocated to the PUCCH for one UE. RBs belonging to the RB pair occupy different subcarriers in each of two slots. In this case, the RB pair allocated to the PUCCH frequency-hops in a slot boundary.

Short Transmission Time Interval (sTTI)

In a next generation communication system, when exchanging information, a method for achieving a very short latency time is considered. To this end, a structure of shortening a transmission time interval (TTI) may be considered, and in this case, a channel for transmitting and receiving data and control information needs to be newly designed.

A TTI which is configured to be shorter than an existing TTI (i.e., one subframe (1 ms)) may be referred to as a short transmission time interval (sTTI). Hereinafter, in the present specification, the sTTI may be interpreted as the same sense as one short TTI subframe (or short subframe).

For example, the sTTI may be configured in units of OFDM symbol (e.g., 2-symbol sTTI, 3-symbol sTTI, 7-symbol sTTI, etc.) and may be configured to be aligned on a boundary of the existing TTI.

Control and data channels related to the sTTI may be expressed in a form in which 's-' is added to a channel used in legacy LTE. For example, a physical downlink control channel may be represented as sPDCCH, a physical downlink data channel may be represented as sPDSCH, a physical uplink control channel may be represented as sPUCCH, and a physical uplink data channel may be represented as sPUSCH.

Figure 5:
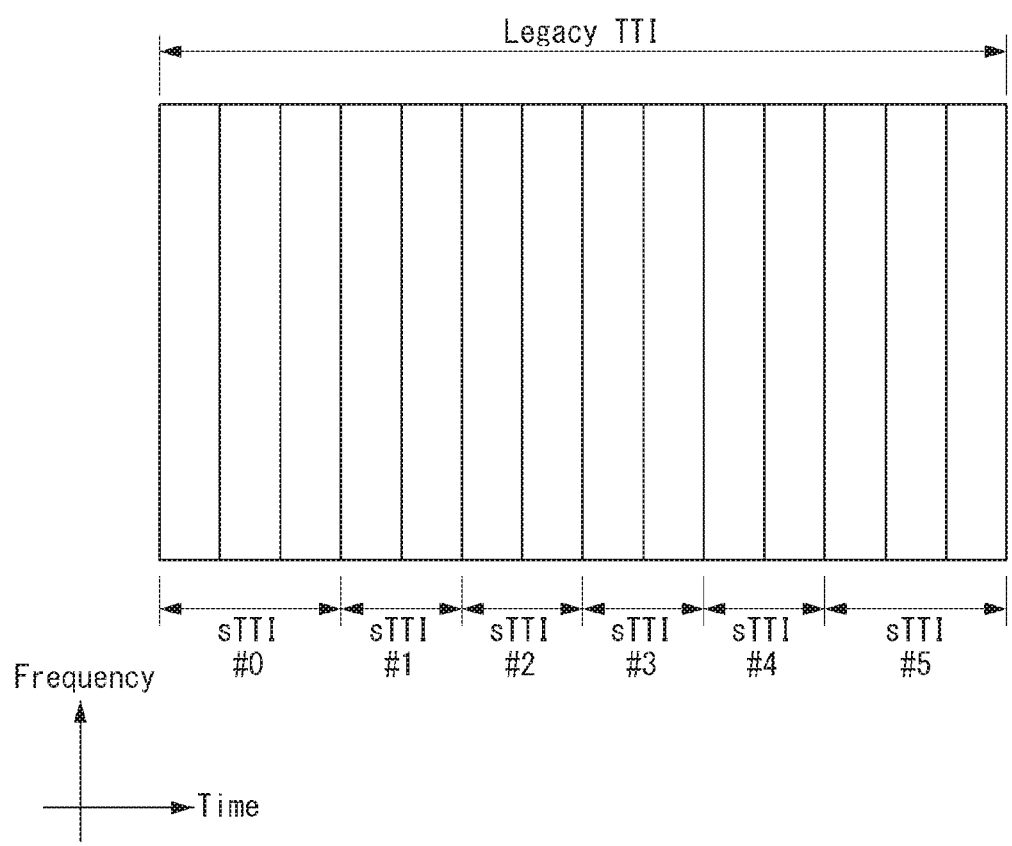
FIG. 5 illustrates an example of a radio frame structure based on a short transmission time interval (TTI) to which a method proposed by the present specification is applicable.

FIG. 5 illustrates an example of a radio frame structure based on a short TTI to which a method proposed by the present specification is applicable. FIG. 5 is merely for the convenience of explanation and does not limit the scope of the present invention.

Referring to FIG. 5, six sTTIs (i.e., four 2-symbol sTTIs and two 3-symbol sTTIs) may be aligned according to an existing legacy TTI (i.e., 14 OFDM symbols). That is, for 14 OFDM symbols, sTTIs may be disposed in a manner of 3(sTTI #0)-2(sTTI #1)-2(sTTI #2)-2(sTTI #3)-2(sTTI #4)-3(sTTI #5). However, an alignment method of the sTTIs is not limited thereto and can be configured by various combinations using sTTIs consisting of various numbers of symbols.

In this case, downlink control information (DCI) for each sTTI may be configured to be transferred via the short PDCCH (sPDCCH) configured for each sTTI. Alternatively, in case of some sTTIs (e.g., sTTI disposed at the foremost based on a legacy TTI), DCI for the corresponding sTTI may be transferred on an existing PDCCH region (i.e., up to three OFDM symbols before the legacy TTI) not the sPDCCH.

Overview of NR system

As propagation of smart phones and Internet of things (IoT) terminals rapidly spreads, an amount of information that is exchanged over a communication network is increasing. Hence, in a next generation radio access technology, an environment (e.g., enhanced mobile broadband communication) that provides faster services to more users than an existing communication system (or existing radio access technology) needs to be considered.

To this end, a design of a communication system that considers machine type communication (MTC) providing services by connecting multiple devices and objects is discussed. Further, a design of a communication system (e.g., ultra-reliable and low latency communication (URLLC)) considering services and/or terminals sensitive to reliability and/or latency of communication is also discussed.

Hereinafter, in the present specification, for the convenience of explanation, the next generation radio access technology is referred to as a new radio access technology (RAT) (NR), and a wireless communication system to which the NR is applied is referred to as an NR system.

Figure 6:
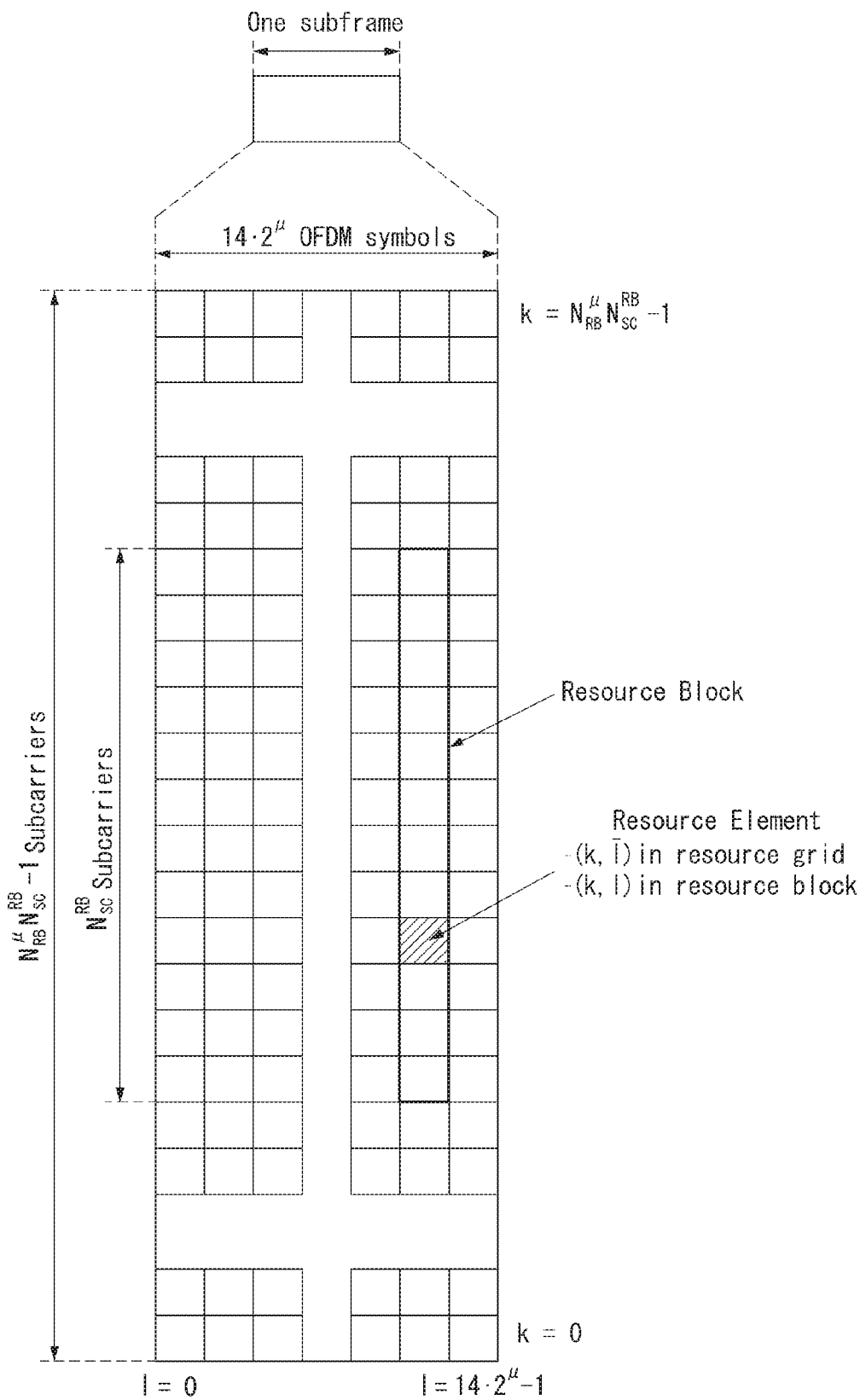
FIG. 6 illustrates an example of a resource grid supported by an NR system to which a method proposed by the present specification is applicable.

FIG. 6 illustrates an example of a resource grid supported by an NR system to which a method proposed by the present specification is applicable.

Referring to FIG. 6, a resource grid consists of $N_{RB}^{\mu} N_{sc}^{RB}$ subcarriers on a frequency domain. FIG. 6 illustrates that one subframe consists of $14 \cdot 2^{\mu}$ OFDM symbols by way of example, but the present invention is not limited thereto.

In the NR system, a transmitted signal is described by one or more resource grids consisting of $N_{RB}^{\mu} N_{sc}^{RB}$ subcarriers and $2^{\mu} N_{symb}^{(\mu)}$ OFDM symbols, where $N_{RB}^{\mu} \le N_{RB}^{max,\mu}$. The $N_{RB}^{max,\mu}$ represents a maximum transmission bandwidth and may change not only between numerologies but also between uplink and downlink.

Figure 7:
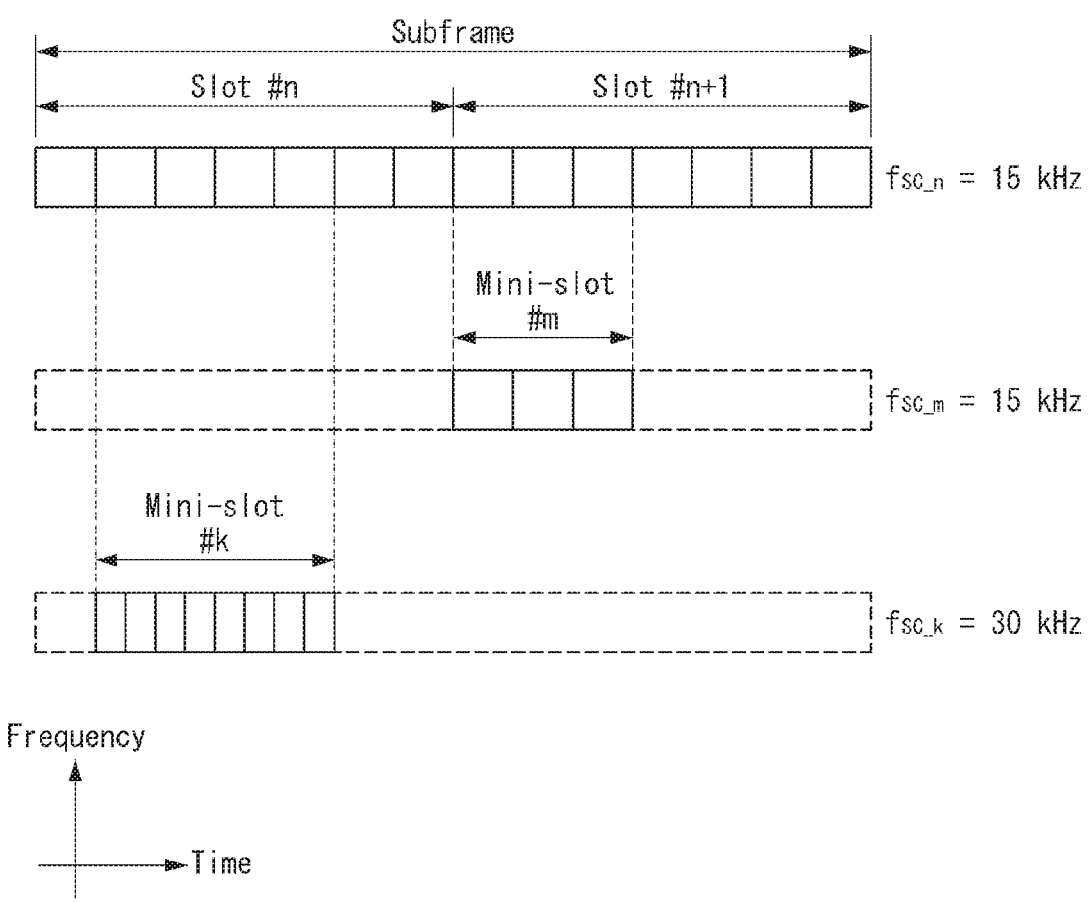
FIG. 7 illustrates an example of a radio frame structure in an NR system to which a method proposed by the present specification is applicable.

FIG. 7 illustrates an example of a radio frame structure in an NR system to which a method proposed by the present specification is applicable. FIG. 7 is merely for the convenience of explanation and does not limit the scope of the present invention.

Referring to FIG. 7, it is assumed that a reference subcarrier spacing (i.e., reference $f_{SC}$) is configured to 15 kHz (i.e., $f_{SC}$=15 kHz), and one subframe consists of two slots (slot #n and slot #n+1). In case of FIG. 7, the number of OFDM symbols constituting the slot is configured to 7, but the present invention is not limited thereto. The number of OFDM symbols may be changed depending on the number of symbols constituting a subframe or may be configured via signaling. For example, the number of symbols constituting the slot may be configured to be the same as the number of symbols constituting the subframe.

Further, in the NR system, a method of introducing a 'mini-slot' is considered in order to utilize more efficiently resources and to reduce a time delay required for transmission and reception of data. Here, the mini-slot may mean a transmission unit configured to support the transmission that is shorter than a length of the slot.

In this instance, a length (i.e., the number of OFDM symbols constituting the mini-slot) of the mini-slot, a position of the mini-slot, etc. may be flexibly configured. For example, a starting symbol of the mini-slot may be configured to be disposed at a starting position (e.g., mini-slot #m) of a specific slot, or configured to be placed at a middle position (e.g., mini-slot #k) of the specific slot.

Further, a subcarrier spacing applied to the mini-slot may be configured to be the same as or different from a subcarrier spacing applied to a slot (and/or a subframe). For example, if the subcarrier spacing for the slot is configured to 15 kHz $f_{SC\_n}$=15 kHz), a subcarrier spacing for the mini-slot #m may be equally configured to 15 kHz ($f_{SC\_n}$=15 kHz). Alternatively, if the subcarrier spacing for the slot is configured to 15 kHz ($f_{SC\_n}$=15 kHz), a subcarrier spacing for the mini-slot #k may be configured to 30 kHz ($f_{SC\_k}$=30 kHz).

As described above, in the next generation communication system, a structure in which a transmission time interval (TTI) is configured to be short may be considered in order to reduce a latency time that may occur when information is transmitted and received. In this case, a method, in which a base station transmits downlink control information (DCI) to a UE, and the corresponding UE efficiently receives the corresponding DCI, needs to be considered.

Specifically, in case of a legacy LTE system, one or more symbols (e.g., three symbols) arranged in a front part of a subframe with a length of 1 ms are configured as a PDCCH, and the base station transmits DCI to the UE via the PDCCH thus configured. When the base station transmits the DCI via the PDCCH, multiple aggregation levels (ALs) may be configured so that one or more control channel elements can be aggregated depending on a channel state.

Here, the aggregation level may mean the number of consecutive CCEs required to transfer one PDCCH. For example, AL 1, AL 2, AL 4, and AL 8 may be configured to constitute a control channel (e.g., PDCCH). The AL 1 may represent aggregation of one CCE, the AL 2 may represent aggregation of two consecutive CCEs, the AL 4 may represent aggregation of four consecutive CCEs, and the AL 8 may represent aggregation of eight consecutive CCEs.

In this instance, the UE may perform blind decoding (BD) by the number of BDs corresponding to configured AL(s) and receive (or decode) DCI. For example, the UE may be configured with the AL 2 and the AL 4 in order to receive DCI via the PDCCH, and the number of BDs corresponding to the AL 2 may be configured to '6' and the number of BDs corresponding to the AL 4 may be configured to '2'. In this case, the UE may perform six BD operations for PDCCH corresponding to the AL 2 and perform two BD operations for PDCCH corresponding to the AL 4 to receive the corresponding DCI.

Even in the case of the wireless communication system supporting the above-mentioned sTTI structure (e.g., the structure of FIG. 5), the base station can configure sPDCCH per TTI (i.e., per sTTI) and transmit DCI.

However, in view of the fact that the wireless communication system supporting the sTTI pursues a short transmission time, the wireless communication system can transmit sPDCCH more frequently than the legacy LTE system. In this instance, if the UE applies a method of decoding PDCCH (i.e., DCI transferred via the PDCCH) in the legacy LTE system, there may be an increase in a decoding time, the number of decoding attempts, and/or an overhead (i.e., decoding overhead) of the UE.

Specifically, since the UE should perform a BD operation for transmitted sPDCCHs, there may be a concern about an increase in time for receiving the DCI as the sPDCCHs are transmitted frequently. That is, in this case, there may be a concern that it takes a large latency time for the UE to decode the sPDCCH.

Accordingly, if a structure (e.g., the structure of FIG. 5) supporting the sTTI is introduced, a method for efficiently transmitting DCI even in an environment transmitted on a per sTTI basis needs to be considered.

In this regard, a method may be considered to transmit 2-level DCI for the sTTI using both the PDCCH and the sPDCCH when the legacy LTE system and a system supporting the sTTI coexist. That is, the DCI for the sTTI may be divided and transferred into DCI transferred via the PDCCH and DCI transferred via the sPDCCH.

Hereinafter, for the convenience of explanation, the DCI transferred via the PDCCH is referred to as 'slow DCI', and the DCI transferred via the sPDCCH is referred to as 'fast DCI'.

Figure 8:
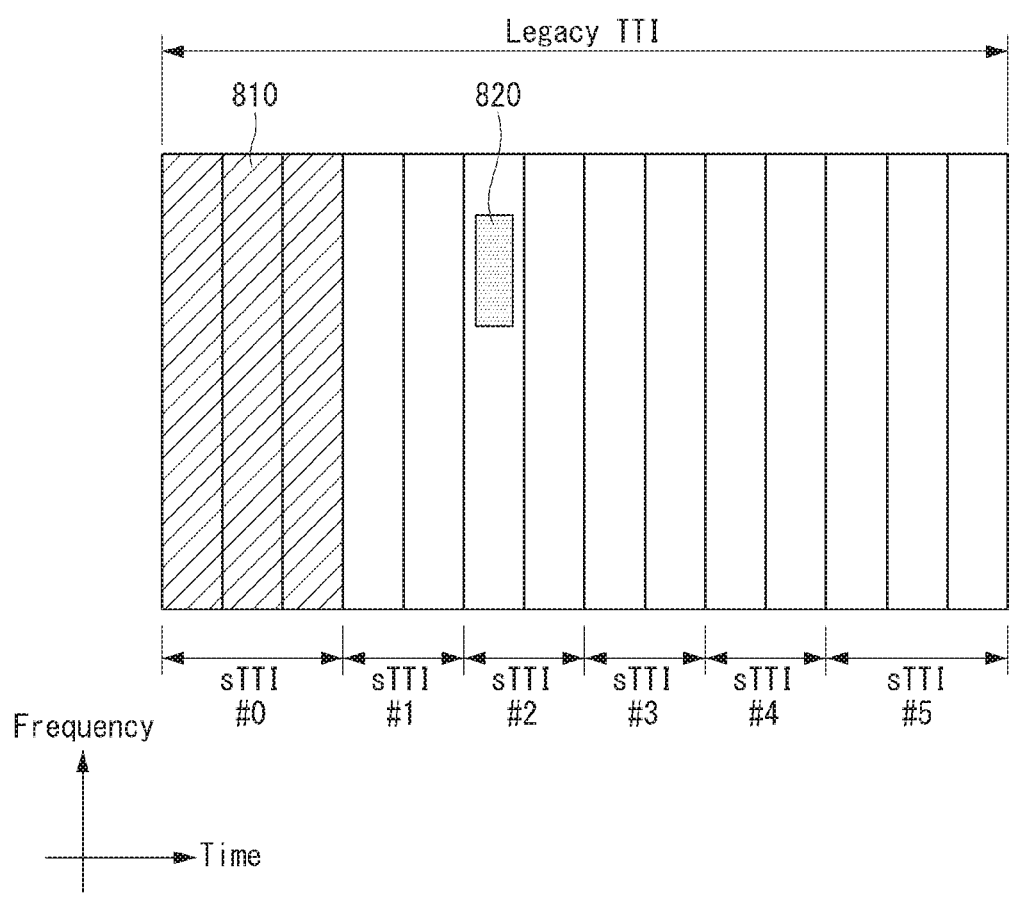
FIG. 8 illustrates an example of a method for performing downlink control information (DCI) transmission of two levels to which a method proposed by the present specification is applicable.

FIG. 8 illustrates an example of a method for performing downlink control information (DCI) transmission of two levels to which a method proposed by the present specification is applicable. FIG. 8 is merely for the convenience of explanation and does not limit the scope of the present invention.

Referring to FIG. 8, a region 810 may represent a PDCCH transmission region configured for a legacy TTI (i.e., legacy LTE system), and a region 820 may represent a sPDCCH transmission region configured for sTTI #2. In this instance, the region 810 consists of three symbols, but a PDCCH may be transmitted using up to three symbols (i.e., may also be transmitted using only one symbol). Further, the region 820 is illustrated as being located in a first symbol of sTTI #2, but is not limited thereto. For example, the region 820 may exist over two symbols or may be located on a second symbol.

In this instance, the base station can use both the PDCCH transferred via the region 810 and the sPDCCH transferred via the region 820 in order to transfer DCI (e.g., DCI for sPDSCH scheduling of the sTTI #2) for the sTTI #2. That is, the base station may transmit part (i.e., slow DCI) of DCI for the sTTI #2 via the region 810 and transmit the rest (i.e., fast DCI) via the region 820.

As described above, when DCI (e.g., DCI contents for sPDSCH scheduling) for one sTTI is divided and transmitted into two DCIs, an overhead related to control signaling can be reduced as compared to transmitting the DCI at a single level.

Hereinafter, in regard to the above-described method for performing the 2-level DCI transmission, the present specification proposes a method for reducing the decoding overhead (i.e., decoding overhead for sPDCCH) of the UE mentioned above. Specifically, when TTIs with different lengths coexists, a method for reducing the number of decoding attempts for DCI (i.e., fast DCI) transmitted via a sPDCCH region will be described.

The number of decoding attempts for the fast DCI is determined by an aggregation level (AL) for the sPDCCH and the number of blinding decoding (BD) attempts configured for each AL Accordingly, in order to reduce the decoding attempt number for the fast DCI, a method for reducing the number of ALs (i.e., AL candidates for the fast DCI) and a method for reducing the BD attempt number corresponding to each AL will be described. In this case, the slow DCI (i.e., DCI transferred via the PDCCH) may be cell-specifically configured (or generated, applied), or group-specifically configured.

The following embodiments proposed by the present specification will be described on the assumption that the legacy LTE system and the system supporting the sTTI coexist, for the convenience of explanation. However, the embodiments are not limited thereto and may be applied to when systems having TTIs with different lengths are shared. For example, the present invention may be equally applied to when a slot and a mini-slot (i.e., a transmission unit with a shorter length than the slot) (e.g., FIG. 7) considered in the NR system coexist. Specifically, the slow DCI may refer to DCI transmitted on a slot (or on a per slot basis), and the fast DCI may refer to DCI transmitted on a mini-slot (or on a per mini-slot basis).

Further, the following embodiments described in the present specification are merely distinguished for the convenience of explanation, and some configuration or features of any embodiment may be included in other embodiments or may be replaced by corresponding configurations or features of other embodiments. For example, a method described in the following second embodiment may be applied to a method described in the following first embodiment, and vice versa.

First Embodiment—Method for Reducing the Number of Aggregation Level Candidates for Fast DCI First, as a method for reducing the number of decodings for fast DCI, a method for reducing the number of aggregation levels (ALs) (i.e., AL candidates) applied to the fast DCI is described. When the number of ALs configured for a sPDCCH to which the fast DCI is transferred decreases, there is an effect capable of reducing the number of blinding decoding (BD) attempts of a UE.

(Method 1: Method of Indicating a Maximum Aggregation Level of Aggregation Level Candidates)

First, a method for transferring a maximum value of ALs configured for fast DCI (i.e., DCI transferred via a sPDCCH of a sTTI) may be considered.

Specifically, a base station may indicate, to a UE, a maximum value of multiple ALs, that are previously configured on a system or shared via higher layer signaling (e.g., RRC signaling), via slow DCI (i.e., DCI transferred via a PDCCH).

A detailed example of the Method 1 is as follows.

For example, it may be assumed that the AL is defined as 1, 2, 4, and 8. In other words, 1, 2, 4, and 8 consecutive CCEs may be aggregated for one sPDCCH. In the present specification, a CCE may be expressed even in case of the sPDCCH for the convenience of explanation, but the CCE used for the sPDCCH may refer to a short CCE (sCCE).

In this instance, if the base station indicates AL 2 (i.e., a case where a maximum AL for fast DCI is AL 2) to the UE via the slow DCI, the UE may assume the AL only as 1 and 2 and attempt blind decoding (BD) for a reception of the fast DCI. In this case, the total number of BD attempts can be reduced as compared to when the corresponding UE assumes the AL as 1, 2, 4, and 8 and performs the BD. That is, a BD overhead of the corresponding UE and time required for the BD can be reduced.

For example, information indicating the maximum AL may correspond to control channel information related to the slow DCI and may be transferred via an AL field.

Alternatively, on the contrary, a method for informing of a minimum AL of the AL candidates may be considered. For example, the base station may indicate the AL 2 to the UE via the slow DCI and configure so that the UE assumes the AL only as 2, 4, and 8 and attempts the BD for a reception of the fast DCI.

(Method 2: Method of Indicating a Specific Group of Grouped Aggregation Levels)

Next, if multiple ALs that are previously configured (or defined or shared via higher layer signaling) are grouped (or gathered), a method of indicating a specific group (or set) may be considered.

Specifically, after the base station configures predetermined AL candidates as one or more groups (or sets), the base station may indicate one group (or set) among the one or more groups via slow DCI. In this instance, configuration information (e.g., aggregation level configuration information) representing the one or more groups may be previously configured (or defined) on a system, or may be transferred from the base station to the UE via higher layer signaling.

A detailed example of the Method 2 is as follows.

For example, it may be assumed that the AL is defined as 1, 2, 4, and 8. In this instance, groups (or sets) for the AL candidates may be configured as {1, 2}, {2, 4}, {4, 8}, {1, 2, 4}, {2, 4, 8}, etc. The groups are merely an example and are not limited thereto. Various AL combinations may be configured.

The base station may indicate one group (or at least one group) among the groups to the UE via the slow DCI, and the UE may assume only AL(s) included in the indicated group and perform the BD. For example, if the base station indicates the AL group {2, 4} to the UE, the UE may assume the AL only as 2 and 4 and attempt the BD for a reception of the fast DCI.

If the corresponding method is used, the total number of BD attempts can be reduced as compared to when the corresponding UE assumes the AL as 1, 2, 4, and 8 (i.e., assumes all the ALs) and performs the BD. Hence, there is an effect that a BD overhead of the corresponding UE and time required for the BD are reduced.

(Method 3: Method of Using Specific Aggregation Level Indication and Window Configuration)

Next, a method of indicating one of AL candidates via slow DCI and configuring a window based on an indicated value may be considered. Here, the window may mean an interval (or a range) including at least one AL (candidates) and may be referred to as an AL window or an AL offset, etc.

Specifically, configuring the window based on the indicated value may mean configuring a range having a predetermined offset (e.g., one or more) based on the indicated value. In this instance, the predetermined offset may be configured to be up and/or down based on the indicated value. In other words, the corresponding method may refer to a method in which the base station indicates one AL value to the UE, and the UE recognizes (or decides) at least one AL value based on the indicated AL value through a predetermined offset range (which is previously configured or transferred).

In this case, a size of the window, i.e., a size of the predetermined offset may be previously configured (or defined) on a system, or may be transferred to the UE via signaling by the base station.

A detailed example of the Method 3 is as follows.

For example, it may be assumed that the AL is defined as 1, 2, 4, and 8. In this instance, if the base station indicates the AL 2 related to a reception of fast DCI to the UE via the slow DCI, the UE may configure the AL 2 and the AL 4 that is greater than the AL 2 by one (i.e., that is higher than the AL 2 by one level) as one window. In this instance, the corresponding UE may assume the AL only as 2 and 4 and attempt (or perform) decoding for the fast DCI.

In other words, the corresponding UE may assume an indicated AL value and an AL value, that is higher than the indicated AL by one level, based on the AL value indicated by the base station and may attempt the BD for the fast DCI. In this case, the above-described predetermined offset may mean+1, i.e., one level toward a high direction.

Further, the base station may also indicate to the UE via the slow DCI that the window (i.e., the predetermined offset range (or interval)) slides to a low level or a high level, or the current window is maintained as it is. That is, the base station may transfer to the UE whether or not the window moves and/or an indicator related to a moving interval. In other words, the window may be configured to be movable within a plurality of predetermined aggregations levels For example, the indicator may be configured in a bitmap format. Specifically, if the indicator is configured in 2-bit, it may be configured so that '00' indicates that the window slides to a lower level by one level, '01' indicates that the window slides to a higher level by one level, and '10' indicates that a location of the window is maintained. However, this is merely an example, and the present invention is not limited thereto. For example, the number of bits and an indication form of the indicator may be variously configured depending on a moving interval or a size of the window, etc.

A detailed example of the corresponding method is as follows.

For example, if a window (i.e., a predetermined offset range) is configured as [2, 4], the base station may indicate to the UE via the slow DCI that the window slides (or moves) to [1, 2], that is lower than [2, 4] by one level. Here, [a, b] represents that 'AL a' and 'AL b' are included in the corresponding window.

Alternatively, a method may be considered to transfer a value (e.g., window size, window starting AL location, etc.) related to a configuration of the window via higher layer signaling and indicate only a window sliding value via the slow DCI.

For example, it may be assumed that a size of the window as a default is 2, and a starting position is configured as AL 2. In this instance, if the base station wants to indicate AL window [4, 8] to the UE, the base station may transfer an indicator corresponding to +2 (i.e., improving the AL of the window by two levels) to the UE via the slow DCI. Hence, the UE assumes only AL 4 and AL 8 not AL 1, AL 2, AL 4, and AL 8 and perform the decoding (i.e., search and decoding for sPDCCH) for the fast DCI.

Through the above-described method, the number of ALs that the UE has to assume for the decoding of the fast DCI can decrease. That is, through the above-described methods, the UE does not need to attempt the decoding by the number of BDs corresponding to all the ALs and can perform the decoding by the number of BDs corresponding to indicated (or configured) some AL(s).

As a result, since the BD corresponding to the omitted AL is not performed if the number of ALs decreases, the decoding attempt number for the reception of the fast DCI can greatly decrease. That is, the above-described methods have an advantage in that a decoding overhead and a decoding time (i.e., latency time) for the reception of the fast DCI of the UE can be reduced.

Figure 9:
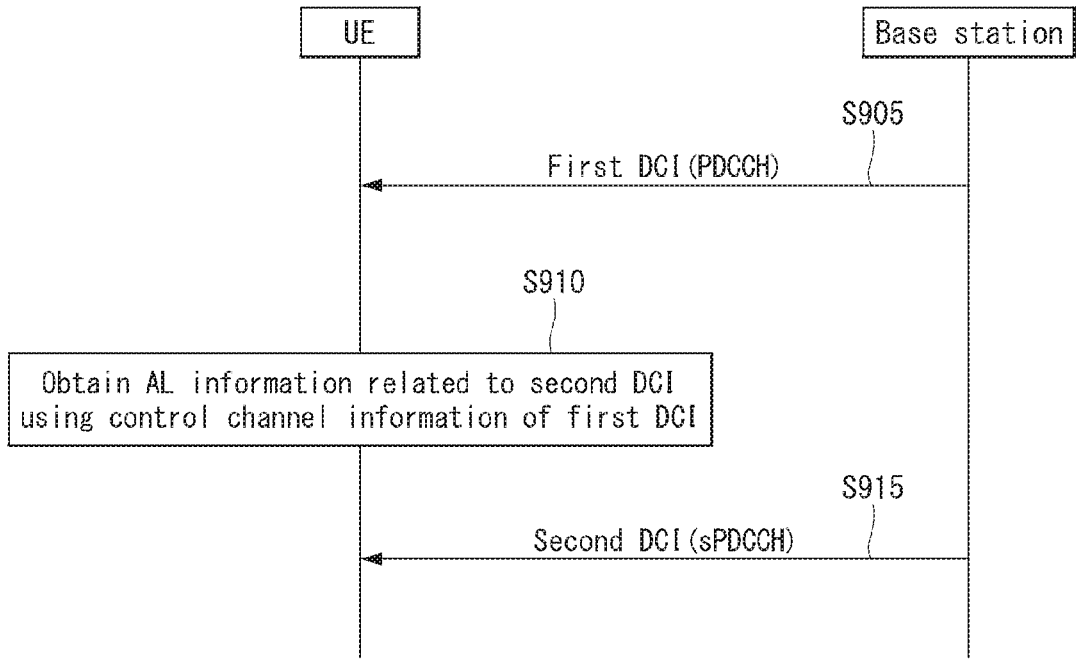
FIG. 9 illustrates an example of a signaling procedure of a UE and a base station transmitting and receiving DCI to which a method proposed by the present specification is applicable.

FIG. 9 illustrates an example of a signaling procedure of a UE and a base station transmitting and receiving DCI to which a method proposed by the present specification is applicable. FIG. 9 is merely for the convenience of explanation and does not limit the scope of the present invention.

Referring to FIG. 9, it is assumed that the base station divides DCI for a sTTI (i.e., DCI for a sPDSCH) into two levels (i.e., first DCI and second DCI) and transmits it to the UE. Further, it is assumed that one or more aggregation levels for a reception of PDCCH and/or sPDCCH are previously configured (or defined) on a system, or are shared by the UE and the base station via higher layer signaling.

A procedure illustrated in FIG. 9 is not limited to only a case where a legacy TTI and a sTTI coexist, and may be equally applied to a case where TTIs with different lengths coexist, a case where a slot and a mini-slot coexist, etc. That is, the PDCCH illustrated in FIG. 9 may be generalized as a first downlink control channel based on a first TTI, and the sPDCCH may be generalized as a second downlink control channel based on a second TTI.

In step S905, the UE may receive the first DCI from the base station via the PDCCH. Here, the first DCI may represent the above-described slow DCI, and the PDCCH follows a radio frame structure based on the first TTI (e.g., legacy TTI).

In this instance, the first DCI includes control channel information representing at least one aggregation level related to a reception of the second DCI among a plurality of aggregation levels (ALs) that is previously configured (or defined). That is, the first DCI may include AL information related to the DCI For example, the control channel information may include indication information corresponding to each of the above-described three methods of the first embodiment. Specifically, the control channel information may indicate a maximum aggregation level of the at least one aggregation level (e.g., Method 1).

Alternatively, if the plurality of aggregation levels is configured as one or more aggregation level groups, the control channel information may indicate a specific aggregation level group of the one or more aggregation level groups (e.g., Method 2). In this case, the UE may (previously) receive, from the base station, aggregation level configuration information representing the one or more aggregation level groups via higher layer signaling.

Alternatively, the control channel information may indicate a specific aggregation level of the plurality of aggregation levels, and the at least one aggregation level (i.e., aggregation level related to the second DCI) may be configured to aggregation level(s) corresponding to a predetermined offset range around the indicated specific aggregation level (e.g., Method 3). Here, the predetermined offset range may represent the above-described window (specifically, AL window). In this case, the predetermined offset range may be configured to be movable (or slidable) within the plurality of aggregation levels according to a sliding indicator.

In this instance, the control channel information may further include window information representing the predetermined offset range and/or the sliding indicator. Alternatively, the window information may be transferred via the higher layer signaling, and the sliding indicator may be transferred via the control channel information (i.e., the first DCI).

In step S910, the UE may obtain aggregation level (AL) information related to the second DCI using the control channel information of the first DCI described above. That is, the UE may decide (or assume) AL candidates for the reception (or the decoding) of the second DCI using the control channel information included in the first DCI.

The step S910 may be performed at the same time as the operation of receiving the first DCI in the step S910, and may be interpreted as being included in the process of receiving the first DCI.

Next, in step S915, the UE may receive the second DCI from the base station via the sPDCCH using the control channel information. Here, the second DCI may represent the above-described fast DCI, and the sPDCCH follows a radio frame structure based on the second TTI (e.g., sTTI).

Specifically, the UE may assume only at least one AL indicated (or configured) by the control channel information not all the ALs and attempt the blind decoding, to thereby receive the second DCI.

Through the procedure, the UE can receive DCI (i.e., DCI for scheduling of the sPDSCH) corresponding to the sTTI via two-level DCI.

Second Embodiment—Method for Reducing the Number of Blind Decodings for Aggregation Level In addition to the above-described method for reducing the number of aggregations levels (ALs), a method for reducing the number of blind decodings (BDs) within each AL may be considered. That is, the method can reduce a decoding overhead and a decoding time of a UE by reducing the number of BDs configured for each AL (corresponding to each AL) not ignoring AL candidates themselves.

For example, a base station may inform the UE of a maximum BD number per AL via slow DCI. Specifically, if an AL is configured to 4 as a default on a system, and the UE is configured to perform the BD a total of four times, the base station may indicate to the UE via the slow DCI that the UE performs the BD for the corresponding AL only twice.

In this instance, on which CCE the UE attempts the BD at the corresponding AL may be previously configured on the system. Alternatively, configuration information (or indicator) on which CCE the UE attempts the BD at the corresponding AL may be transferred via signaling. For example, if the base station indicates to the UE via the slow DCI that the number of BDs is limited to two, the UE may be configured to perform the BD twice in decreasing order or increasing order of CCE indexes.

In addition, a method may be considered to indicate a ratio of the BD number per AL that is previously configured on the system or semi-statically configured. In this instance, a method of finding candidates of each search space (SS) may include determining, as the number of candidates, the BD number per AL that is previously configured on the system or semi-statically configured, and then performing the BD on some of the candidates based on a UE identifier (ID). In this instance, the ratio may be indicated by the base station via the slow DCI.

For example, it may be assumed that the BD number is reduced to one half (i.e., 50%) when the BD number for AL 4 is configured to 2. In other words, a candidate 1 and a candidate 2 for the BD may be configured, and one of the candidate 1 or the candidate 2 may be determined. For example, in order to determine (or find) the candidate 1 or the candidate 2, a value applying mod 2 (modular arithmetic 2) to the UE ID or a cell ID (e.g., C-RNTI) may be used. That is, if a result of performing modular arithmetic on the UE ID is '0', it may correspond to the candidate 1, and if the result is '1', it may correspond to the candidate 2. That is, a randomization scheme may be performed to support more efficiently multiplexing between multiple UEs.

In addition to the above-described method, a method may be considered to determine only the number of candidates for a maximum AL (i.e., maximum AL of predetermined ALs). In this case, resources for a smaller AL than the maximum AL may be limited to be configured within resources included in candidate(s) covered by CCEs of the maximum AL.

For example, if a maximum AL is 8, and two candidates are configured for the maximum AL of 8, 4 candidates may be configured for AL 4, 8 candidates may be configured for AL 2, and 16 candidates may be configured for AL 1. Specifically, in case of AL 8, CCE 0 to CCE 7 may be configured as candidate 1, and CCE 8 to CCE 15 may be configured as candidate 2. In this case, candidate 1 and candidate 2 for the AL 4 may be respectively configured as CCE 0 to CCE 3 and CCE 4 to CCE 7 included in the candidate 1 of the AL 8, and candidate 3 and candidate 4 for the AL 4 may be respectively configured as CCE 8 to CCE 11 and CCE 12 to CCE 15 included in the candidate 2 of the AL 8.

In the above-described method, if the total BD attempt number for fast DCI exceeds BD capability of the UE, the base station can reduce the BD attempt number for a lowest AL, or reduce the BD attempt number for multiple ALs. In this case, the base station may indicate the maximum AL and/or the BD candidate number of the maximum AL via signaling (e.g., higher layer signaling or slow DCI).

Figure 10:
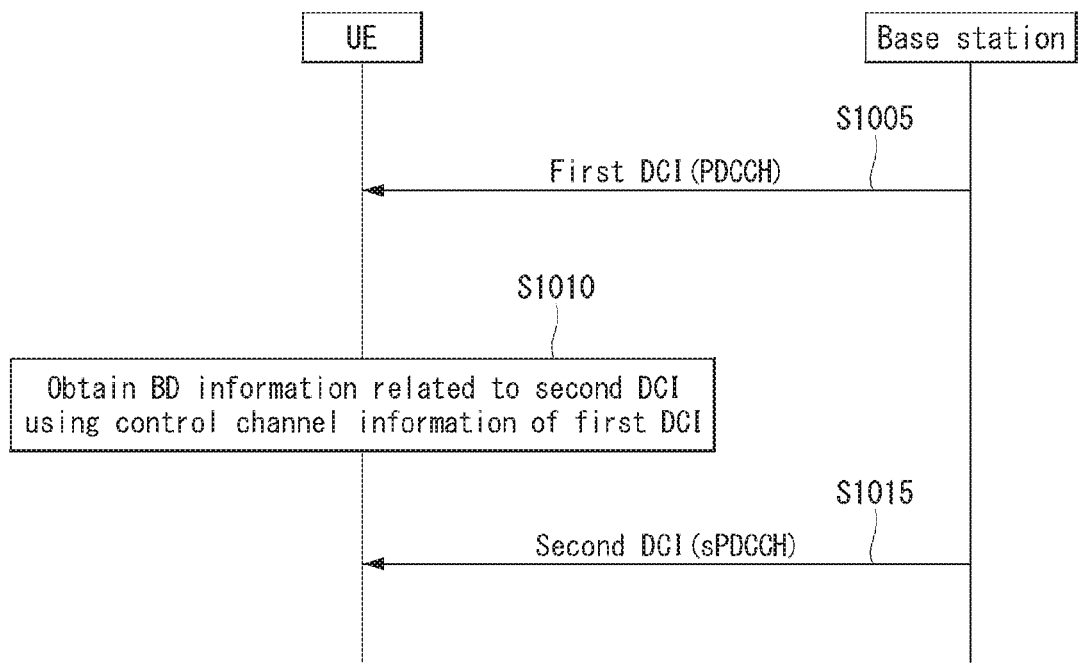
FIG. 10 illustrates another example of a signaling procedure of a UE and a base station transmitting and receiving DCI to which a method proposed by the present specification is applicable.

FIG. 10 illustrates another example of a signaling procedure of a UE and a base station transmitting and receiving DCI to which a method proposed by the present specification is applicable. FIG. 10 is merely for the convenience of explanation and does not limit the scope of the present invention.

Referring to FIG. 10, it is assumed that the base station divides DCI for a sTTI (i.e., DCI for a sPDSCH) into two levels (i.e., first DCI and second DCI) and transmits it to the UE. Further, it is assumed that one or more aggregation levels for a reception of PDCCH and/or sPDCCH are previously configured (or defined) on a system, or are shared by the UE and the base station via higher layer signaling. Here, information about the number of blind decodings (BDs) for each of the one or more aggregation levels may be previously configured or transferred via signaling.

A procedure illustrated in FIG. 10 is not limited to only a case where a legacy TTI and a sTTI coexist, and may be equally applied to a case where TTIs with different lengths coexist, a case where a slot and a mini-slot coexist, etc. That is, the PDCCH illustrated in FIG. 10 may be generalized as a first downlink control channel based on a first TTI, and the sPDCCH may be generalized as a second downlink control channel based on a second TTI.

Since steps S1005 and S1015 of FIG. 10 are similar to the steps S905 and S915 of FIG. 9, description of redundant contents is omitted.

In FIG. 10, the first DCI includes blind decoding (BD) information related to the second DCI. The corresponding information may refer to information representing a maximum number of BDs to be performed on each of one or more ALs that are previously configured (or signaled). In other words, the base station may transfer to the UE information indicating a maximum BD attempt number for each AL via the first DCI.

In this instance, the corresponding information may belong to control channel information included in the first DCI.

In step S1010, the UE may receive the first DCI and obtain BD information related to the second DCI using the control channel information of the first DCI. That is, the UE may decide (or recognize) a maximum number of BD attempts to be performed on each of ALs configured to the UE.

Hence, in the step S1015, the UE may perform a BD operation by the maximum number indicated to each of the ALs configured to the UE and may receive the second DCI via the sPDCCH.

Through the procedure, the UE performs only the BD by the BD number indicated to each AL, and thus a decoding overhead and/or a decoding time related to the reception of the second DCI can be reduced In various embodiments of the present invention, a method may be additionally considered to inform the UE of an interval, in which AL information (i.e., information indicating some of all the ALs) and/or BD information (i.e., information indicating a maximum BD number per AL) configured by the above-described methods are valid, using slow DCI.

First, an interval, in which information included in the slow DCI is valid, may be previously configured without a separate notification in the slow DCI. For example, AL information and/or BD information may be configured to be valid during only one subframe based on a long TTI (e.g., legacy TTI).

Alternatively, the base station may transfer to the UE information representing a valid time interval of the AL information and/or the BD information (i.e., control channel information in FIG. 9 and/or FIG. 10) configured by the above-described method, via the slow DCI. For example, the base station may indicate to the UE via the slow DCI that the AL information and/or the BD information are valid during k subframes. In this case, the UE may use the corresponding AL information and/or the corresponding BD information during the k subframes. In this instance, if the UE fails in reception of information representing a valid time interval, the corresponding UE may be configured to perform the BD on all the cases.

Alternatively, the fact that the base station does not configure an AL in a specific time interval or configures a BD value per configured AL to 0 may mean deactivation of monitoring for the fast DCI in the corresponding time interval.

In various embodiments of the present invention, the above-described methods may be dividedly applied to DCI for downlink (i.e., DL DCI) and DCI for uplink (i.e., UL DCI).

First, in regard to the above-described first embodiment, a value indicated via the slow DCI may be differently configured for DL DCI and UL DCI in order to reduce the number of ALs.

For example, if the base station informs of a maximum AL value of AL candidates via the slow DCI (i.e., method 1), different values may be dividedly transferred (or configured) to a case where the slow DCI and the fast DCI are DL DCI and a case where the slow DCI and the fast DCI are UL DCI. Further, even if the base station informs of a specific AL group of multiple AL groups (or sets) via the slow DCI (i.e., method 2), different values may be dividedly transferred (or configured) to a case where the slow DCI and the fast DCI are DL DCI and a case where the slow DCI and the fast DCI are UL DCI. Further, even in a method (i.e., method 3) for configuring and signaling a window of a specific size for AL candidates, different values may be dividedly transferred (or configured) to a case where the slow DCI and the fast DCI are DL DCI and a case where the slow DCI and the fast DCI are UL DCI.

Further, in regard to the above-described second embodiment, a value indicated via the slow DCI may be differently configured for DL DCI and UL DCI in order to reduce a maximum BD attempt number.

Further, information representing an interval in which the AL information and/or the BD information described above are valid may be differently configured for DL DCI and UL DCI.

These methods are not limited to differently configuring only for DL DCI and UL DCI, and a value (or information) indicated by the above-described methods may be differently configured for various DCI combinations. For example, the value indicated by the above-described methods may be differently configured for transmission mode (TM) dependent DCI and TM independent DCI.

Overview of Device to which the Present Invention is Applicable

Figure 11:
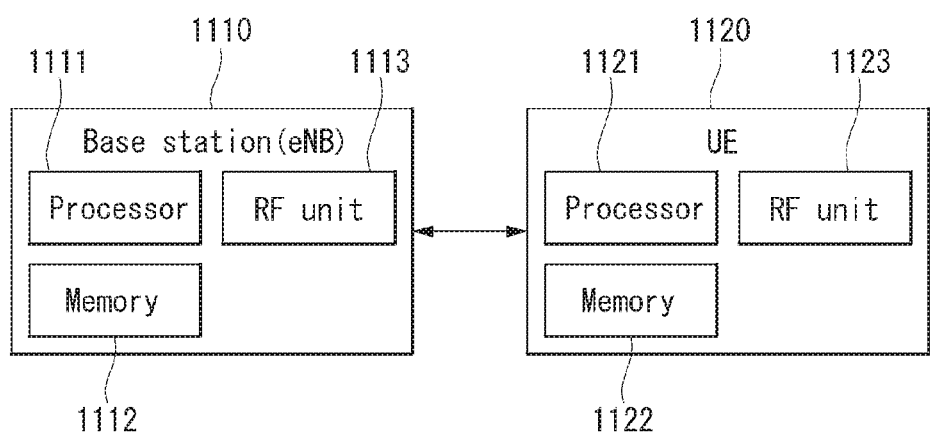
FIG. 11 illustrates a block configuration diagram of a wireless communication device to which methods proposed by the present specification are applicable.

FIG. 11 illustrates a block configuration diagram of a wireless communication device to which methods proposed by the present specification are applicable.

Referring to FIG. 11, a wireless communication system includes a base station 1110 and a plurality of UEs 1120 located in an area of the base station 1110.

The base station 1110 includes a processor 1111, a memory 1112, and a radio frequency (RF) unit 1113. The processor 1111 implements functions, processes, and/or methods proposed in FIGS. 1 to 10. Layers of a radio interface protocol may be implemented by the processor 1111. The memory 1112 is connected to the processor 1111 and stores various types of information for driving the processor 1111. The RF unit 1113 is connected to the processor 1111 and transmits and/or receives a radio signal.

The UE 1120 includes a processor 1121, a memory 1122, and a RF unit 1123.

The processor 1121 implements functions, processes, and/or methods proposed in FIGS. 1 to 10. Layers of a radio interface protocol may be implemented by the processor 1121. The memory 1122 is connected to the processor 1121 and stores various types of information for driving the processor 1121. The RF unit 1123 is connected to the processor 1121 and transmits and/or receives a radio signal.

The memories 1112 and 1122 may be inside or outside the processors 1111 and 1121 and may be connected to the processors 1111 and 1121 through various well-known means.

For example, in order to transmit and receive DL data in the wireless communication system supporting low latency services, the UE may include a RF unit for transmitting and receiving a radio signal, and a processor functionally connected to the RF unit.

Further, the base station 1110 and/or the UE 1120 may have a single antenna or multiple antennas.

Figure 12:
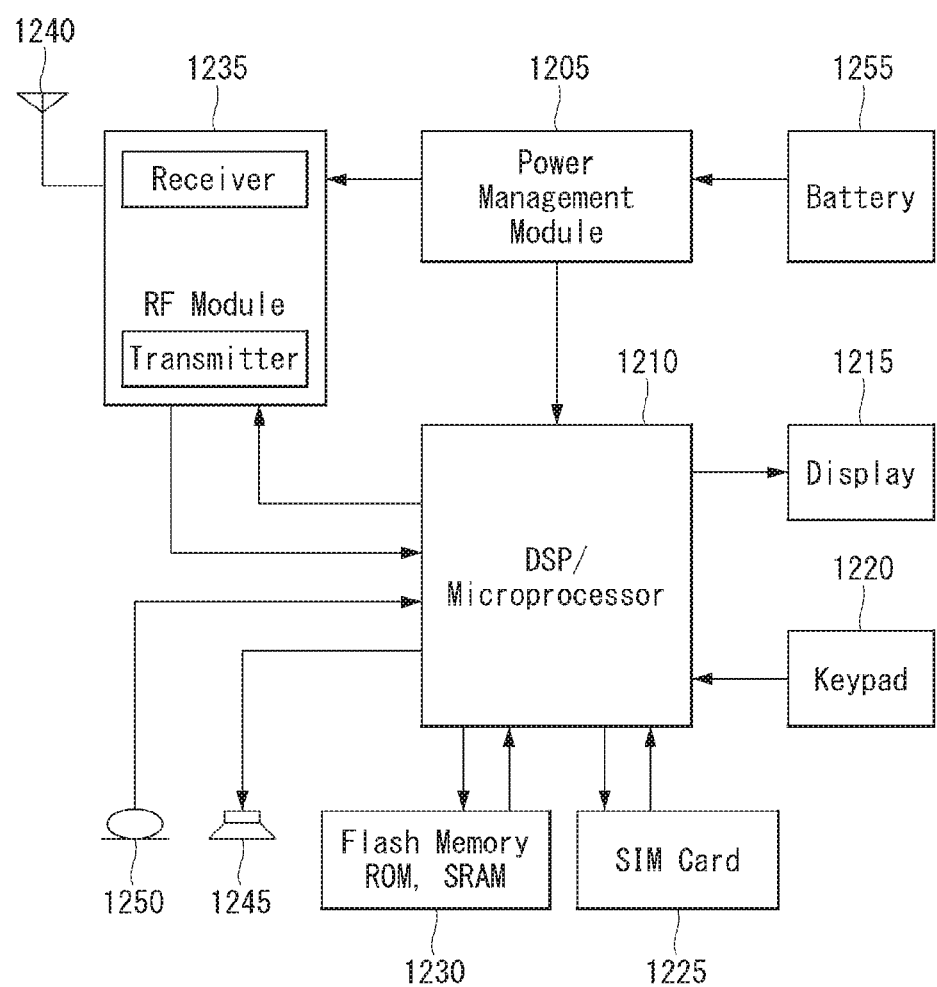
FIG. 12 illustrates a block configuration diagram of a communication device according to an embodiment of the present invention.

FIG. 12 illustrates a block configuration diagram of a communication device according to an embodiment of the present invention.

In particular, FIG. 12 illustrates in more detail the UE illustrated in FIG. 11.

Referring to FIG. 12, the UE may include a processor (or digital signal processor (DSP)) 1210, an RF module (or RF unit) 1235, a power management module 1205, an antenna 1240, a battery 1255, a display 1215, a keypad 1220, a memory 1230, a subscriber identification module (SIM) card 1225 (which is optional), a speaker 1245, and a microphone 1250. The UE may also include a single antenna or multiple antennas.

The processor 1210 implements functions, processes, and/or methods proposed in FIGS. 1 to 10. Layers of a radio interface protocol may be implemented by the processor 1210.

The memory 1230 is connected to the processor 1210 and stores information related to operations of the processor 1210. The memory 1230 may be inside or outside the processor 1210 and may be connected to the processors 1210 through various well-known means.

A user inputs instructional information, such as a telephone number, for example, by pushing (or touching) buttons of the keypad 1220 or by voice activation using the microphone 1250. The processor 1210 receives and processes the instructional information to perform an appropriate function, such as to dial the telephone number. Operational data may be extracted from the SIM card 1225 or the memory 1230. Further, the processor 1210 may display instructional information or operational information on the display 1215 for the user's reference and convenience.

The RF module 1235 is connected to the processor 1210 and transmits and/or receives an RF signal. The processor 1210 forwards instructional information to the RF module 1235 in order to initiate communication, for example, transmit a radio signal configuring voice communication data. The RF module 1235 includes a receiver and a transmitter to receive and transmit the radio signal. The antenna 1240 functions to transmit and receive the radio signal. Upon reception of the radio signal, the RF module 1235 may transfer a signal to be processed by the processor 1210 and convert the signal into a baseband. The processed signal may be converted into audible or readable information output via the speaker 1245.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

INDUSTRIAL APPLICABILITY

Although a method for transmitting and receiving downlink control information in a wireless communication system according to the present invention has been described focusing on examples applying to the 3GPP LTE/LTE-A system and the 5G system (new RAT system), it can be applied to various wireless communication systems.

What is claimed is:

1. A method for receiving, by a user equipment, downlink control information (DCI) in a wireless communication system, the method comprising:
   receiving, from a base station, first DCI on a first downlink control channel based on a first transmission time interval (TTI),
   wherein the first DCI includes control channel information for a specific control channel element (CCE) aggregation level of at least one CCE aggregation level among a plurality of predetermined CCE aggregation levels; and
   receiving, from the base station, the second DCI on a second downlink control channel based on a second TTI using the control channel information.

2. The method of claim 1, wherein the specific CCE aggregation level is a maximum CCE aggregation level of the at least one CCE aggregation level.

3. The method of claim 1,
   wherein the plurality of predetermined CCE aggregation levels is configured as one or more CCE aggregation level groups, and
   wherein the control channel information includes a specific CCE aggregation level group of the one or more CCE aggregation level groups.

4. The method of claim 3, further comprising receiving, from the base station, includes aggregation level configuration information for the one or more CCE aggregation level groups by higher layer signaling.

5. The method of claim 1,
   wherein the at least one CCE aggregation level is configured to a CCE aggregation level corresponding to a predetermined offset range around the specific CCE aggregation level.

6. The method of claim 5, wherein the predetermined offset range is configured to be movable within the plurality of predetermined CCE aggregation levels according to a sliding indicator.

7. The method of claim 6, wherein the control channel information further includes window information for the predetermined offset range and the sliding indicator.

8. The method of claim 6, further comprising:
receiving, from the base station, window information for the predetermined offset range by higher layer signaling,
wherein the sliding indicator is included in the control channel information.

9. The method of claim 1,
wherein the first DCI further includes information for a valid time interval of the control channel information, and
wherein the valid time interval is configured in units of subframe.

10. The method of claim 1, wherein the control channel information is differently configured depending on whether the second DCI is DCI for uplink or DCI for downlink.

11. The method of claim 1,
wherein the first TTI relates to a time for transmitting one subframe, and
wherein the second TTI is configured to be shorter than the first TTI.

12. The method of claim 1,
wherein the second TTI is configured to be shorter than the first TTI,
wherein the first downlink control channel is a physical downlink control channel (PDCCH), and
wherein the second downlink control channel is a short PDCCH (sPDCCH).

13. A user equipment receiving downlink control information (DCI) in a wireless communication system, the user equipment comprising:
a radio frequency (RF) unit configured to transmit and receive a radio signal; and
a processor functionally connected to the RF unit,
wherein the processor controls to:
receive, from a base station, first DCI on a first downlink control channel based on a first transmission time interval (TTI),
wherein the first DCI includes control channel information for a specific control channel element (CCE) aggregation level of at least one CCE aggregation level related to a reception of second DCI among a plurality of predetermined CCE aggregation levels; and
receive, from the base station, the second DCI on a second downlink control channel based on a second TTI using the control channel information.

* * * * *